United States Patent
Hübl

[11] Patent Number: 5,943,383
[45] Date of Patent: Aug. 24, 1999

[54] METHOD OF DETERMINING A RECEIVER TIME AT A RECEPTION INSTANT OF A TRANSMISSION TIME MARKER CONTAINED IN RECEIVED DATA ELEMENTS

[75] Inventor: Markus Hübl, Markt Schwaben, Germany

[73] Assignee: Siemens Aktiengesellschaft, Munich, Germany

[21] Appl. No.: 09/013,293

[22] Filed: Jan. 26, 1998

Related U.S. Application Data

[63] Continuation of application No. PCT/DE95/00969, Jul. 24, 1995.

[51] Int. Cl.⁶ ............................. H04L 23/00; H04J 15/00; G08C 15/00
[52] U.S. Cl. ............................. 375/377; 370/546; 370/252
[58] Field of Search .................................... 375/377, 354, 375/372, 370, 365; 370/252, 253, 503, 506, 508, 516, 517, 546

[56] References Cited

U.S. PATENT DOCUMENTS

| 5,347,540 | 9/1994 | Karrick | 375/224 |
| 5,535,193 | 7/1996 | Zhang et al. | 375/228 |

FOREIGN PATENT DOCUMENTS

| 0 634 870 A2 | 1/1995 | European Pat. Off. | H04N 7/24 |

OTHER PUBLICATIONS

"Internet Time Synchronization: The Network Time Protocol" (Mills), 8089 IEEE Transactions on Communications 39, Oct. 1991, No. 10, pp. 1482–1493.

"Techniques for Packet Voice Synchronization" (Warren), IEEE Journals on Selected Areas in Communications, vol. Sac.1, No. 6, Dec. 1983.

"Integrated Video Codecs in ATM Networks" (Voeten et al.), Proceedings, vol. VI, p. 25.

*Primary Examiner*—Don N. Vo
*Assistant Examiner*—Albert Park
*Attorney, Agent, or Firm*—Herbert L. Lerner; Laurence A. Greenberg

[57] ABSTRACT

A receiver time at the reception instant of a transmission time marker contained in received data elements is determined. A multiplicity of successively received data elements are stored, and a receiver time which corresponds to a data element reception instant is also stored. Then the stored data elements are searched for a transmission time marker, and the receiver time is determined which corresponds to the reception instant of the transmission time marker, using the stored receiver time(s). The novel method is distinguished by the fact that the receiver time which corresponds to the reception instant of a single data element is stored per specific or indefinite multiplicity of stored data elements, and that the determination of the receiver time corresponding to the reception instant of the transmission time marker takes place on the basis of the stored receiver time(s). The determination is effected by extrapolating or interpolating based on the stored receiver time(s).

20 Claims, 6 Drawing Sheets

METHOD OF DETERMINING A RECEIVER TIME AT A RECEPTION INSTANT OF A TRANSMISSION TIME MARKER CONTAINED IN RECEIVED DATA ELEMENTS

CROSS-REFERENCE TO RELATED APPLICATION

This is a continuation of copending international application PCT/DE95/00969, filed Jul. 24, 1995, which designated the United States

BACKGROUND OF THE INVENTION

Field of the Invention

The present invention relates to a method of determining a receiver time at the reception instant of a transmission time marker contained in received data elements. The method in general comprises the steps of storing a multiplicity of successively received data elements, storing a receiver time which corresponds to a data element reception instant, searching through the stored data elements for a transmission time marker, and determining the receiver time which corresponds to the reception instant of the transmission time marker, using the stored receiver time(s).

Data elements to be transmitted, such as, for example, audio and video data, are increasingly being digitized prior to data transmission. This format change has the advantage that the bandwidths of transmission channels can be kept narrow, and/or they can be utilized in an optimum manner, by employing digital data reduction and compression methods.

The digitized and, if appropriate, compressed data are formatted for transmission into packet- or stream-oriented data streams.

In order to assist the proper reconstruction of the data at the receiving end, the data can be provided at the transmitter end with additional information such as, for example, time markers and the like.

The formatting of data packets and the incorporation of time markers in audio and video transmission is defined in Part 1 of the MPEG2 Standard (ISO/IEC 13818), for example.

Time markers may be provided, for example, to synchronize a clock of a receiver (decoder) with that of a transmitter (encoder) (such that, for example, a picture or an audio excerpt can be output at the correct point in time) and/or in order to control the speed of the operating cycle in the receiver.

In order to synchronize the receiver clock, the receiver of the digitally coded data stream must extract from the incoming data stream the transmission time markers inserted by the transmitter and take them as a basis for readjusting the receiver clock, while taking account of the respective current value of the receiver clock (reception time markers).

The extraction of the transmission time markers requires a method which analyzes the data stream arriving at the receiver.

Such an analysis can be carried out by means of dedicated hardware. A programmable system can also be used as an alternative or in a supplementary manner.

Figure 4:
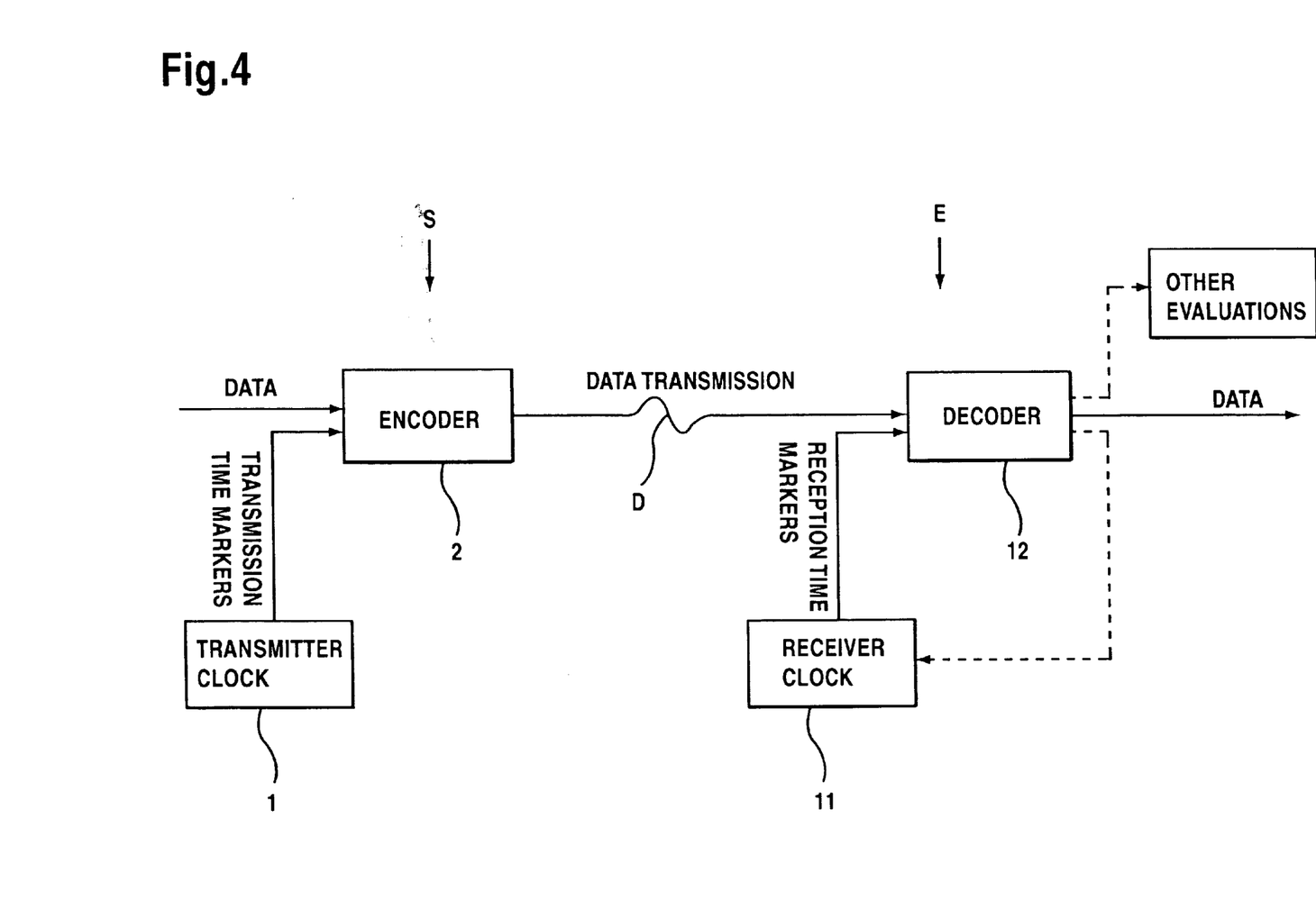
FIG. 4 is a block diagram of a prior art configuration for transmitting and evaluating data elements provided with transmission time markers.

The basic principle on which a system of this type operates is illustrated in the block diagram shown in FIG. 4.

The system shown in FIG. 4 comprises a transmitter S, a receiver E and a data transmission path D, via which data elements output by the transmitter are sent in the form of a data stream to the receiver. The receiver E receives the data and processes them further.

Transmission time markers are added to the data sent by the transmitter S. The time markers are generated by a transmitter clock 1 and are inserted by means of an encoder 2 to the data to be transmitted. In addition to inserting the transmission time markers, the encoder 2 may also compress the data to be transmitted, format the data to be transmitted in accordance with a predetermined transmission protocol, etc.

In the receiver E, the data stream transmitted by the transmitter passes into a decoder 12.

The decoder 12 recovers the data from the data stream. Furthermore, it filters the transmission time markers out of the received data stream and carries out a comparison to see whether these transmission time markers correspond to the reception time markers which have been respectively generated by a receiver clock 11 and likewise input into the decoder 12.

If there is no such correspondence, the receiver clock 11 is synchronized in accordance with an output signal of the decoder 12.

If the readjustment of the receiver clock 11 is repeated at sufficiently short intervals, it is always guaranteed that the transmitter clock 1 and the receiver clock 11 run synchronously.

In practice, however, this synchronization necessitates a considerable technical outlay, as will be explained in detail below. This is primarily due to the complicated recovery of the transmission time markers from the data stream received by the receiver.

A conventional method with which the transmission time markers are recovered from the data stream received by the receiver is the so-called scanning/parsing of the incoming data elements in real time.

Figure 5:
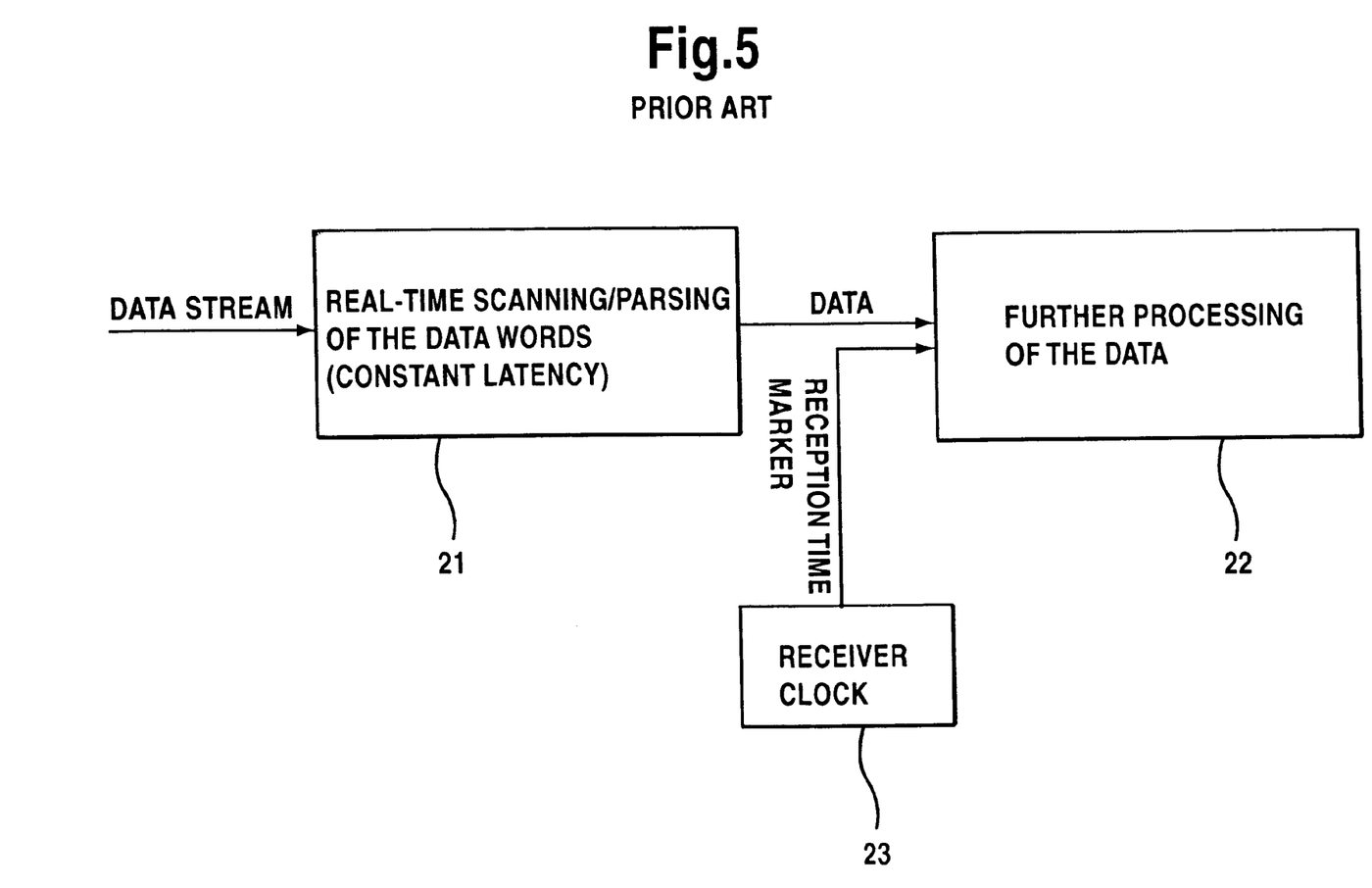
FIG. 5 is a block diagram of a prior art configuration with a device for the real-time scanning/parsing of incoming data elements.

A system for carrying out this method is shown in FIG. 5.

According to FIG. 5, the data stream transmitted to the receiver passes into a scanner/parser 21.

This scanner/parser 21 is constructed from hardware elements and/or implemented using a sufficiently fast programmable system.

While analyzing the data stream structure, the scanner/parser 21 successively checks, for all of the data elements of the data stream, whether the respectively current data element is a transmission time marker. The data elements and the additional information items extracted from the data stream are output as data to a further processing unit 22.

Even though the scanner/parser 21 is able to process the incoming data elements of the data stream in real time, the above-described checking nevertheless requires a certain amount of time. Furthermore, the transmission of data from the transmitter to the receiver also requires a certain amount of time.

The data output by the scanner/parser 21 to the further processing unit 22 therefore have a latency which corresponds to the sum of the above-mentioned time periods. It is assumed that the latency is constant with respect to time.

In addition to the data output by the scanner/parser 21, the reception times output by a receiver clock 23 and in the form of reception time markers are also input into the further processing unit 22.

In the further processing unit 22, the transmission time markers contained in the data are compared with the corresponding reception time markers. However, in this comparison account must accordingly be taken of the above-mentioned latency.

Depending on the comparison results, the further processing unit 22 can output a signal on the basis of which the receiver clock 23 is readjusted or on the basis of which signals based on the receiver time are correspondingly influenced.

The above-described scanner/parser 21 is technically extremely complicated to realize only because it must be able to analyze the incoming data stream, identifying its structure, in real time.

A system for readjusting the receiver clock, or for influencing the signals derived therefrom, in which real-time evaluation of the incoming data stream is not necessary is a programmable scanner/parser with data and reception time memories.

Where the scanner/parser is realized as a programmable unit (for example using a microcomputer or microcontroller) the fundamental advantage is attained that the scanner/parser can be adapted in a simple manner to differently structured data streams, which is not readily possible regularly with a purely hardware realization of the scanner/parser.

Figure 6:
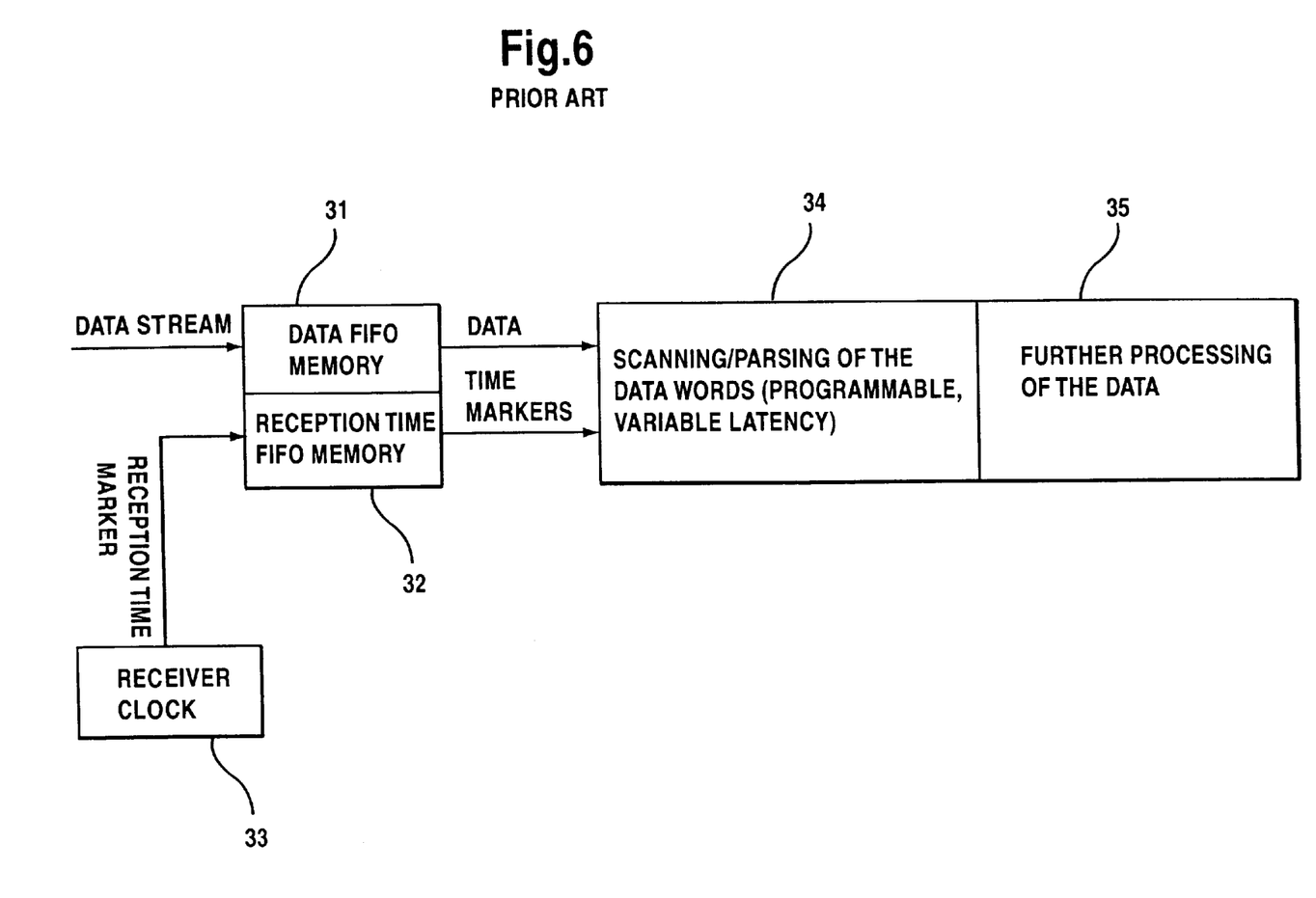
FIG. 6 is a block diagram of a prior art configuration with a device for the non-real-time scanning/parsing of incoming data elements.

FIG. 6 shows a configuration containing a programmable scanner/parser with a data memory and reception time memory. According to FIG. 6, the incoming data stream flows into a data FIFO memory 31, in which the data elements (data words) of the data stream are successively stored.

A further FIFO memory in the form of a reception time FIFO memory 32 is provided in parallel with the data FIFO memory. Reception times output by a receiver clock 33 are stored in this reception time FIFO memory 32, which reception times are in the form of reception time markers that are respectively assigned to the data elements stored in the data FIFO memory.

Due to the fact that an assigned reception time marker is stored in the reception time FIFO memory 32 for each data element stored in the data FIFO memory 31, the two FIFO memories have the same depth.

The data elements and time markers stored in the FIFO memories may be subjected to further processing following a variable, indefinite time, depending on the depth of the FIFO memories and on the data transmission rate and pauses in the data transmission.

The data elements and time markers stored in the FIFO memories are then output to a programmable scanner/parser 34.

While analyzing the structure of the incoming data stream, the scanner/parser 34 once again checks every data element (in question) of the data stream as to whether it is a transmission time marker.

If a transmission time marker is found during this, it is compared with the reception time marker assigned to it.

Depending on the result of the comparison between the transmission time markers and the associated reception time markers (taking account of the latency), a signal which is not shown in FIG. 6 can be output, on the basis of which the receiver clock is readjusted or on the basis of which those signals which are based on the receiver clock are correspondingly influenced.

The time marker comparison and the evaluation of the comparison result are carried out in a further processing unit which follows the scanner/parser 34. The further processing unit 35 can be constructed separately or together with the scanner/parser 34 as a single unit.

The prior art method which will be described below with reference to FIG. 6 has the disadvantage that the FIFO memories used must have a considerable capacity, which makes the system for carrying out the method correspondingly expensive, large and susceptible to faults, owing to the substantial hardware outlay.

SUMMARY OF THE INVENTION

It is accordingly an object of the invention to provide a method of determining a receiver time at the reception instant of a transmission time marker contained in received data elements, which overcomes the above-mentioned disadvantages of the prior art devices and methods of this general type and which allows determining the receiver time with minimal technical outlay.

With the foregoing and other objects in view there is provided, in accordance with the invention, a method of determining a receiver time at a reception instant of a transmission time marker contained in received data elements.

The method comprises the following steps:
transmitting and receiving data in a stream of data element;
storing a multiplicity of successively received data elements;
storing a receiver time which corresponds to a single data element reception instant of a (defined or arbitrary) multiplicity of stored data elements;
searching through the stored data elements for a transmission time marker; and
extrapolating or interpolating the stored receiver times and determining a receiver time which corresponds to the reception instant of the transmission time marker.

In other words, the objects of the invention are satisfied in that only the receiver time which corresponds to the reception instant of a single data element is stored per specific or indefinite multiplicity of stored data elements, and that the determination of the receiver time corresponding to the reception instant of the transmission time marker is effected on the basis of the stored receiver time(s) by extrapolation or interpolation.

Due to the fact that the data elements of the data stream and—where necessary—the reception time markers assigned thereto are buffered prior to the data stream analysis, it is not necessary for the determination to take place in real time. The hardware components used do not therefore have to be designed for the otherwise required high operating speed.

Since, furthermore, it is a feature of the invention that the reception time markers are also stored only for a few selected, desired data elements, the memory for the storage of the reception time markers can be dimensioned relatively small, which leads to a considerable reduction in the hardware outlay.

The increased computation which has to be accepted for the reduction in the hardware outlay is minimal and is of no consequence in practical applications.

The invention is highly advantageous in that, on the one hand, the method can be implemented in an extremely flexible manner, i.e., it can be adapted to a wide variety of transmission systems, and, on the other hand, the invention makes it possible to carry out the determination with a minimum in technical outlay.

In accordance with an added feature of the invention, the transmitting step comprises transmitting the data elements in a data stream at a data transmission rate which is constant at least in sections.

In accordance with another feature of the invention, the multiplicity of successively stored data elements are data elements of a data packet of a packet- or stream-oriented data stream. The step of storing the receiver time may comprise storing the receiver time which corresponds to the reception instant of the start of a respective data packet.

In accordance with an additional feature of the invention, the determining step comprises determining the receiver clock time corresponding to the reception instant of the transmission time marker by taking into account a spacing of the transmission time marker from a data element for which a receiver time is stored. The spacing of the transmission time marker from the data element is preferably determined by counting and ascertaining at which data element the transmission time marker begins, and starting a count after the data element for which a receiver time is stored.

In accordance with a further feature of the invention, the data transmission rate is taken into account in the step of determining the receiver time corresponding to the reception instant of the transmission time marker.

In accordance with again an added feature of the invention, the reception instant of the transmission time marker of a data packet B is calculated in accordance with the formula $$t_{M,B} = t_{H,B} + n_B/R$$

where $t_{M,B}$ is the reception instant, $T_{S,B}$ is the transmission time marker of the data packet B, $t_{H,B}$ is the reception instant of the start of the data packet B, $n_B$ is the number of received data elements from the instant $t_{H,B}$ to the transmission time marker $T_{S,B}$, and R is the data transmission rate.

In accordance with again another feature of the invention, the data elements and/or the receiver times are stored in a FIFO memory (a data FIFO memory or reception time FIFO memory). The receiver times may be stored in a single register FIFO memory, and the data elements and receiver times may be stored in a common data and reception time FIFO memory.

In accordance with again a further feature of the invention, the step of storing the receiver times comprises storing each of the receiver times in response to a respective trigger signal. The method further comprises a step of monitoring, with the scanner, an appearance of a predetermined data element or a predetermined data element sequence for which a receiver time is to be stored, and generating the trigger signal with the scanner. The trigger signal is generated with the scanner alternatively or additionally after a specific number of data elements have been received since the last receiver time has last been stored.

In accordance with yet an additional feature of the invention, the scanner monitors in real time.

In accordance with yet an added feature of the invention, the stored data elements and the stored receiver times are output for analysis and/or further processing following a variable, indefinite time after a reception thereof.

In accordance with yet a further feature of the invention, the scanner is simulated in an analysis unit for analyzing the data and the method further comprises a step of determining, for each data element, whether a receiver time is stored for the respective data element.

In accordance with a concomitant feature of the invention, the receiver times are stored and further processed in the form of reception time markers.

Other features which are considered as characteristic for the invention are set forth in the appended claims.

Although the invention is illustrated and described herein as embodied in method of determining a receiver time at the reception instant of a transmission time marker contained in received data elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
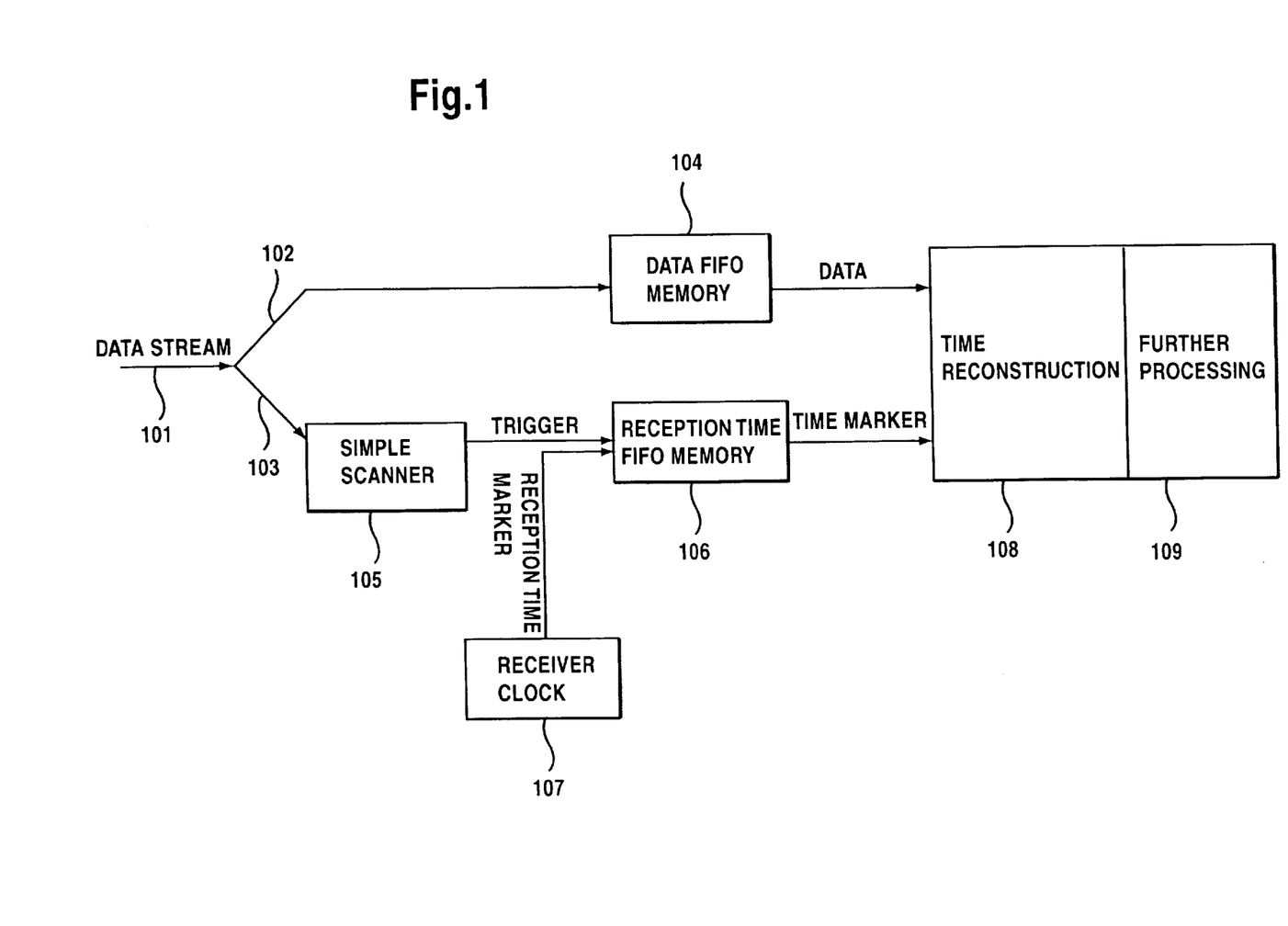
FIG. 1 is a block diagram of a first exemplary embodiment of a configuration for carrying out the method according to the invention.
Figure 2:
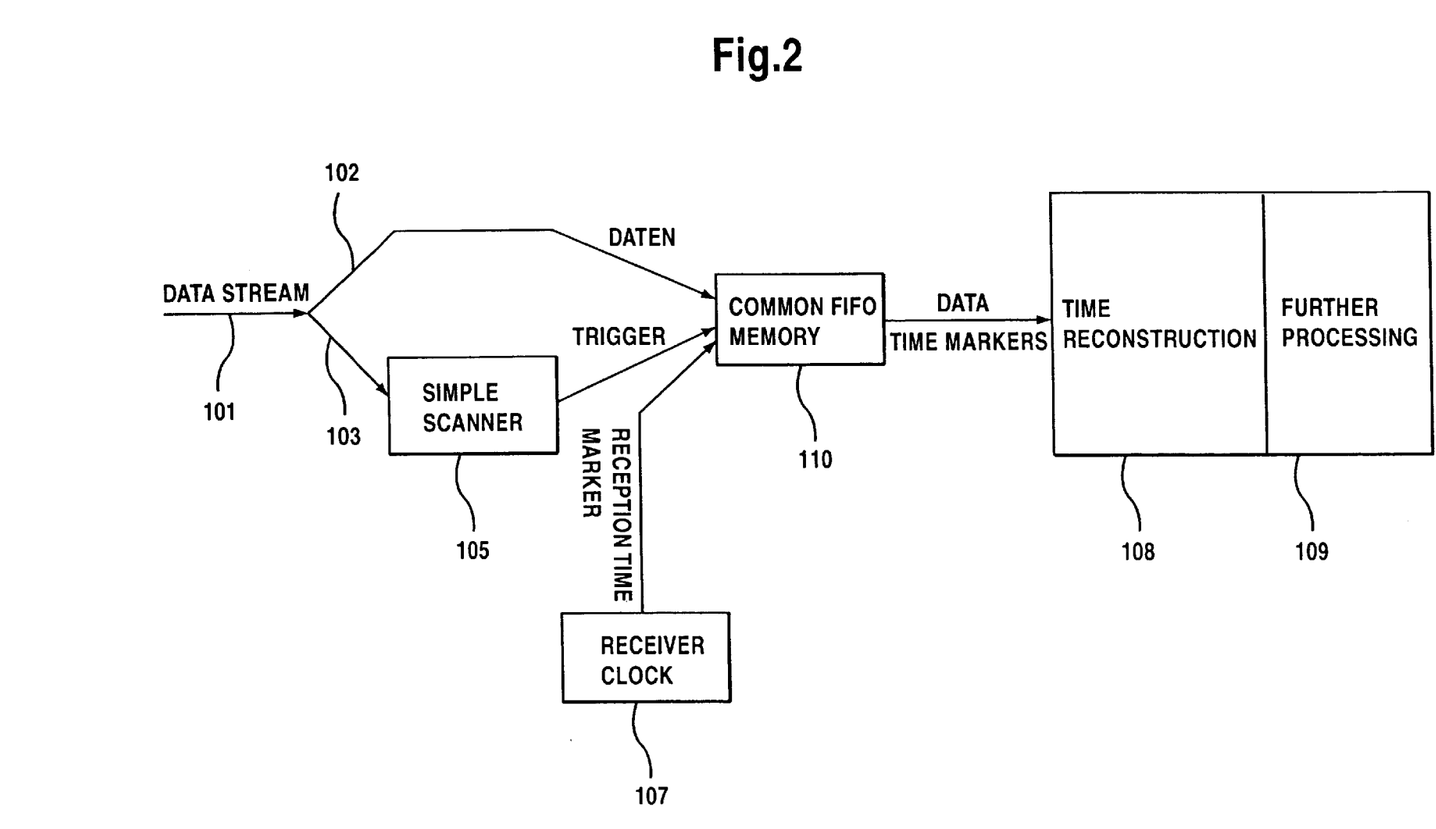
FIG. 2 is a block diagram of a second exemplary embodiment thereof.

Referring now to the figures of the drawing in detail and first, particularly, to FIGS. 1 and 2 thereof, the components of the configuration are hardware and/or programmable units (for example a microcomputer or microcontroller), which carry out the complete evaluation of the individual data elements of the incoming data stream not in real time, but rather, after corresponding buffering, following a variable, indefinite time.

According to FIG. 1, a transmission path 101 carrying the data stream branches into two transmission lines 102 and 103. The first transmission line 102 directs the data stream to a data FIFO memory 104, in which the data elements of the data stream are successively stored. The second transmission line 103 directs the data stream to a scanner 105, which identifies predetermined, easily identifiable data elements of the incoming data stream and emits a trigger signal upon each identification.

Where data streams are organized in data packets, the scanner 105 can identify, for example, the start of the respective data packets (e.g. using a unique value of the first data element, using an external trigger signal, or using a non-unique value in connection with the packet length).

However, there is no restriction to the effect that the start of a data packet is used as the "easily identifiable data element." Rather, any desired data element can be involved here. It is preferable, however, that the data element appears repeatedly in the data stream at suitable time intervals.

The identification of the "easily identifiable data element" by the scanner takes place in real time.

Merely searching for specific data elements in a data stream is quite simple to implement and, in spite of the required real-time execution, permits a simple structure of the scanner. The structure of the scanner is at any rate substantially simpler than the structure of the scanner/parser used in conventional arrangements of this type.

The trigger signal generated by the scanner 105 upon identification of a data element to be identified is fed to a reception time FIFO memory 106.

In addition to the trigger connection, the reception time FIFO memory 106 has a second input connection, into which reception time markers generated by a receiver clock 107 are input.

However, a reception time marker applied to the reception time FIFO memory 106 is stored in the reception time FIFO memory only when a trigger signal is generated by the scanner 105.

By virtue of the fact that the corresponding reception time marker is stored in the reception time FIFO memory 106 not for every data element stored in the data FIFO memory 104, but only for a few selected data elements, the depth of the reception time FIFO memory can be reduced to a minimum.

If it is ensured that sufficiently fast further processing of the data stored in the FIFO memories takes place, the reception time FIFO memory 106 can even be formed by a single register.

The data elements stored in the data FIFO memory 104 and the reception time markers stored in the reception time FIFO memory 106 are in each case output to a time reconstruction unit 108. However, this can occur any time after the storage of the data elements and reception time markers in the respective FIFO memories. The time reconstruction unit 108 has a non-illustrated scanner section which simulates the above-described scanner 105. The scanner section can consequently identify the data elements for which reception time markers have been stored in the reception time FIFO memory 105. The time reconstruction unit 108 further has a transmission time marker identification section which is likewise not shown in the figure and is able to register the appearance of transmission time markers among the data elements and, if appropriate, also the contents of the transmission time markers.

When the data elements stored in the data FIFO memory 104 are now transmitted consecutively to the time reconstruction unit 108, each individual data element is checked there by the scanner section and the transmission marker identification section to see whether it is a data element for which an assigned reception time is stored in the reception time FIFO memory 106 or which is a transmission time marker or a part thereof.

If the scanner section of the time reconstruction unit 108 has detected a data element for which an assigned reception time is stored in the reception time FIFO memory 106, then the time reconstruction unit 108 begins to count the data elements from that data element onward.

The reception time which is stored for the relevant data element is designated below as the reference element reception time. The count of the time reconstruction unit is designated below as the reference element spacing.

If the transmission time marker identification section detects a data element which represents a transmission time marker or the beginning of one, then the reception instant of the transmission time marker can be determined, according to the invention, by means of extrapolation or interpolation in a further processing unit 109, which is constructed separately or together with the time reconstruction unit 108 as one unit, even when no reception time marker has been stored for the relevant data element.

In this case, the reception time of the transmission time marker can be determined, for example, from the reference element reception time, the reference element spacing and the transmission rate at which the stored data elements have been transmitted from the transmitter to the receiver (measured in data elements or data words per second). This can be effected, for example, in accordance with the following formula:

Reception time of transmission time marker =

$$\text{Reference element reception time} + \frac{\text{Reference element spacing}}{\text{Transmission Rate}}$$

It is assumed here that the transmission rate is constant at least in sections and is known or can be measured. The values stored in the reception time FIFO memory in conjunction with the corresponding reference element spacings can be used, for example, to measure the transmission rate.

The above option for calculating the reception time of the transmission time marker is only one of many options. An extremely wide variety of further calculation methods are conceivable using extrapolation and interpolation methods.

The receiver clock 107 can be synchronized with the transmission clock by appropriate readjustment via a non-illustrated connection between the further processing unit 109 and the receiver clock. As an alternative, or in addition, the temporal sequence of the further processing of the data elements may be correspondingly influenced.

FIG. 2 shows a modification relative to FIG. 1. Corresponding components are designated with the same reference numerals.

The only difference between the configurations of FIGS. 1 and 2 is that the latter is provided with only a single FIFO memory 110. That memory, however, stores both the transmitted data elements and the specifically selected reception instants in the form of reception time markers and, consequently, replaces the data FIFO memory 104 and the reception time FIFO memory 106 of FIG. 1. The depth of this common FIFO memory 110 is dimensioned such that it can receive the data elements which are to be buffered anyway and the reception time markers which are occasionally slipped in. In other words, the depth of the common FIFO memory 110 corresponds approximately to the depth of the data FIFO memory 104 according to FIG. 1.

When the memory contents are evaluated, the fact that the received data elements and the reception time markers are stored such that they are nested in one another must be taken into consideration and, accordingly, it may be necessary to observe a changed read-out order.

Otherwise, however, the structure of the configurations shown in FIGS. 1 and 2 is identical.

The exact temporal sequence of the steps described above is described below with reference to FIG. 3.

Figure 3:
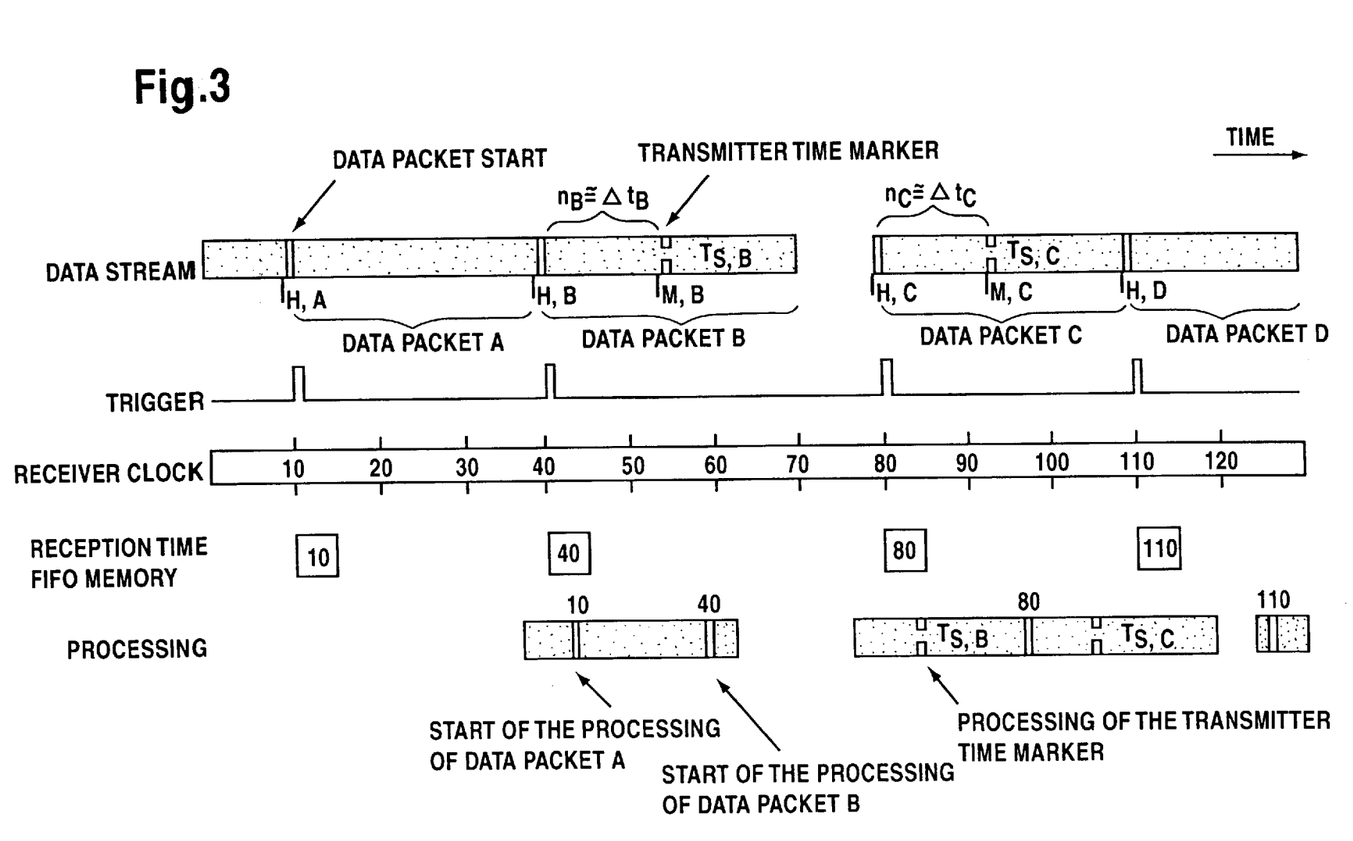
FIG. 3 is a timing chart illustrating the temporal sequence of the individual steps of the method according to the invention.

As shown by the "data stream" row in FIG. 3, the incoming data stream is composed of individual data packets (data packets A to D).

The respective packet start can be unambiguously identified by the scanner 105. Once a packet start has been identified, the scanner 105 sends a trigger signal to the reception time FIFO memory 106 or the common FIFO memory 110; this is illustrated in the "trigger" row in FIG. 3.

The effect of the trigger signal is that the respectively current value of the receiver clock 107 is stored in the form of a reception time marker in the relevant FIFO memory.

This is illustrated in the rows "receiver clock" and "reception time FIFO memory" in FIG. 3. Therefore, when a first trigger pulse, which is assigned to the start of a data packet A, occurs, the reading of the receiver clock is equal to "10", and, accordingly, the value 10 is written as reception time marker to the corresponding FIFO memory.

The values 40, 80 and 110 at the start of the data packets B, C and D are written in an analogous way into the corresponding FIFO memory.

The data elements of the individual data packets are stored in the data FIFO memory 104 or likewise in the common FIFO memory 110.

An indefinite time after the reception and storage of the data elements, the latter are evaluated by the units downstream of the FIFO memories.

In the example shown in FIG. 3, the evaluation of the data packet A begins, for instance, at the receiver time reading 43 (see row "processing" in FIG. 3).

At the same time, the associated packet start reception time marker $t_{H,A}=10$ is read from the corresponding FIFO memory. The evaluation unit thus knows that the start of the data packet A arrived in the receiver at the receiver time reading 10.

Since the data packet A contains no information items (transmission time markers) which ought to be referenced with the receiver clock, the reception time marker $t_{H,A}$ for the data packet A is rejected.

According to the example illustrated in FIG. 3, the evaluation of the data packet B begins, for instance, at the receiver time reading 59.

When the corresponding packet start reception time marker $t_{H,B}=40$ is read from the corresponding FIFO memory, the evaluation unit knows that the start of the data packet H arrived in the receiver at the receiver time reading 40.

As the evaluation of the data packet B progresses, in the example a transmission time marker having the value $T_{S,B}$ is identified, for instance, at the receiver time reading 84 and is to be related to the associated reception instant $t_{M,B}$.

Since a corresponding reception time marker is not stored for this transmission time marker, the value for $t_{M,B}$ must be calculated, which is done as follows:

A number $n_B$ data elements (data words) have been counted between the start of the data packet B and the transmission time marker $T_{S,B}$. On the basis of the known data transmission rate R (in data elements or data words per second), the time between the packet start reception instant of the data packet B ($t_{H,B}=40$) and the reception of the transmission time marker $T_{S,B}$ ($t_{M,B}$) can be calculated as $\Delta t_B = n_B/R$.

The reception instant $t_{M,B}=t_{H,B}+\Delta t_B$ of the transmission time marker $T_{S,B}$ is thus known.

The further data and time markers in the data stream can be evaluated in a corresponding manner.

This can easily be demonstrated with reference to FIG. 3. For the sake of completeness, a listing of the designations used in FIG. 3 and their meanings is given below.

$t_{H,A}$: reception instant of the start of data packet A
$t_{H,B}$: reception instant of the start of data packet B
$t_{H,C}$: reception instant of the start of data packet C
$t_{H,D}$: reception instant of the start of data packet D
$t_{M,B}$: reception instant of the transmission time marker B
$t_{M,C}$: reception instant of the transmission time marker C
$T_{S,B}$: transmission time marker B
$T_{S,C}$: transmission time marker C $n_B$: number of received data elements from the last reception time marker to the transmission time marker B
$n_C$: number of data elements received from the last reception time marker to the transmission time marker C
$\Delta t_B$: time between $t_{H,B}$ and $t_{M,B}$
$\Delta t_C$: time between $t_{H,C}$ and $t_{M,C}$ Finally, the special features are explained using two concrete application examples (Transport Stream and Program Stream according to MPEG2 Standard (ISO/IEC 13818)).

The transport stream is a packet-oriented data stream. Each packet contains 188 bytes. A packet start can be identified with little outlay in the scanner, since the preceding circuit can signal the packet start via a control line. As an alternative, the scanner can check each byte to see whether it has the value $47_{16}$, and then identify a packet start and, every 188 bytes, send a trigger signal to the reception time FIFO memory for storing the current reception time marker.

The program stream is stream-oriented. The data packets coded in the stream have a variable length. A packet start can be identified with little outlay in the scanner, since a packet start is characterized by four bytes having the values $0_{16}$, $0_{16}$, $1_{16}$, $BA_{16}$. This data sequence is unique and is not emulated in the useful data.

Both in the transport stream and in the program stream, the transmission time markers for the synchronization of the receiver clock—if present—are situated a fixed number of elements or words away from the data packet start.

Since in a real system the data rate within a packet is constant and the likewise constant latency between the transmitter (MPEG2 encoder) and receiver (MPEG2 decoder) is insignificant, a reference instant stored for the data packet start can be used directly as a reference for the transmitted transmission time marker.

If these special features are additionally utilized, an even further simplified and even more reliably operating method of determining the receiver time at the reception instant of a transmission time marker contained in received data elements is achieved.

I claim:

1. A method of determining a receiver time at a reception instant of a transmission time marker contained in received data elements, wherein the method comprises:
   transmitting and receiving data in a stream of data element;
   storing a multiplicity of successively received data elements;
   storing a receiver time which corresponds to a single data element reception instant of a multiplicity of stored data elements;
   searching through the stored data elements for a transmission time marker; and
   extrapolating or interpolating the stored receiver times and determining a receiver time which corresponds to the reception instant of the transmission time marker.

2. The method according to claim 1, which comprises defining a specific number for the multiplicity of stored data elements.

3. The method according to claim 1, wherein the transmitting step comprises transmitting the data elements in a data stream at a data transmission rate which is constant at least in sections.

4. The method according to claim 1, wherein the multiplicity of successively stored data elements are data elements of a data packet of a packet- or stream-oriented data stream.

5. The method according to claim 4, wherein the step of storing the receiver time comprises storing the receiver time which corresponds to the reception instant of the start of a respective data packet.

6. The method according to claim 1, wherein the determining step comprises determining the receiver time corresponding to the reception instant of the transmission time marker by taking into account a spacing of the transmission time marker from a data element for which a receiver time is stored.

7. The method according to claim 6, which comprises determining the spacing of the transmission time marker from the data element by counting and ascertaining at which data element the transmission time marker begins, and starting a count after the data element for which a receiver time is stored.

8. The method according to claim 1, which comprises taking into account a data transmission rate in the step of determining the receiver time corresponding to the reception instant of the transmission time marker.

9. The method according to claim 1, wherein the determining step comprises calculating the reception instant of the transmission time marker of a data packet B in accordance with the formula $$t_{M,B} = t_{H,B} + n_B/R$$

where $t_{M,B}$ is the reception instant, $T_{S,B}$ is the transmission time marker of the data packet B, $t_{H,B}$ is the reception instant of the start of the data packet B, $n_B$ is the number of received data elements from the instant $t_{H,B}$ to the transmission time marker $T_{S,B}$, and R is the data transmission rate.

10. The method according to claim 1, wherein the step of storing the received data elements comprises storing the data elements in a data FIFO memory.

11. The method according to claim 1, wherein the step of storing the receiver times comprises storing the receiver times in a reception time FIFO memory.

12. The method according to claim 11, which comprises storing the receiver times in a single register FIFO memory.

13. The method according to claim 1, wherein the steps of storing the received data elements and storing the receiver times comprises storing the data elements and the receiver times in a common data and reception time FIFO memory.

14. The method according to claim 1, wherein the step of storing the receiver times comprises storing each of the receiver times in response to a respective trigger signal.

15. The method according to claim 14, which further comprises monitoring, with a scanner, an appearance of one of a predetermined data element and a predetermined data element sequence for which a receiver time is to be stored, and generating the trigger signal with the scanner.

16. The method according to claim 15, which further comprises generating the trigger signal with the scanner alternatively or additionally after a specific number of data elements have been received since the last receiver time has last been stored.

17. The method according to claim 15, wherein the monitoring step comprises monitoring with the scanner in real time.

18. The method according to claim 1, which further comprises outputting the stored data elements and the stored receiver times for at least one of analysis and further processing following a variable, indefinite time after a reception thereof.

19. The method according to claim 18, which comprises simulating a scanner in an analysis unit for analyzing the data and determining, for each data element, whether a receiver time is stored for the respective data element.

20. The method according to claim 1, which comprises storing and further processing the receiver times in a form of reception time markers.

* * * * *